US009235338B1

(12) United States Patent
Barr et al.

(10) Patent No.: US 9,235,338 B1
(45) Date of Patent: Jan. 12, 2016

(54) PAN AND ZOOM GESTURE DETECTION IN A MULTIPLE TOUCH DISPLAY

(71) Applicant: Amazon Technologies, Inc., Reno, NV (US)

(72) Inventors: Matthew Browne Barr, Herndon, VA (US); Nathan Leung, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 314 days.

(21) Appl. No.: 13/838,142

(22) Filed: Mar. 15, 2013

(51) Int. Cl.
*G06F 3/048* (2013.01)
*G06F 3/0485* (2013.01)

(52) U.S. Cl.
CPC .................... *G06F 3/0485* (2013.01)

(58) Field of Classification Search
CPC ............................ G06F 2203/04806
See application file for complete search history.

(56) References Cited

U.S. PATENT DOCUMENTS

| 2008/0231610 | A1 | 9/2008 | Hotelling et al. | 345/173 |
| 2010/0194682 | A1 | 8/2010 | Orr et al. | 345/156 |
| 2011/0069029 | A1 | 3/2011 | Ryu et al. | 345/173 |
| 2011/0074710 | A1* | 3/2011 | Weeldreyer et al. | 345/173 |
| 2012/0304113 | A1 | 11/2012 | Patten et al. | 715/800 |
| 2012/0306930 | A1 | 12/2012 | Decker et al. | 345/667 |
| 2012/0323521 | A1* | 12/2012 | De Foras et al. | 702/141 |
| 2014/0055374 | A1* | 2/2014 | Bart et al. | 345/173 |

OTHER PUBLICATIONS

Euclidean distance—Wikipedia, the free encyclopedia, www.en.wikipedia.org/wiki/Euclidean_distance 3pgs, (last visited May 21, 2013).
Centroid—Wikipedia, the free encyclopedia, www.en.wikipedia.org/wiki/Centroid 8pgs, (last visited May 21, 2013).
Absolute deviation—Wikipedia, the free encyclopedia, www.en.wikipedia.org/wiki/Mean_absolute_deviation 5pgs, (last visited May 21, 2013).

* cited by examiner

*Primary Examiner* — Peiyong Weng
(74) *Attorney, Agent, or Firm* — K&L Gates LLP

(57) ABSTRACT

Systems and methods of zooming and panning an image on a multi-touch enabled computing device are provided. The difference in the mean absolute deviation of consecutive move events is used to determine the scaling factor to apply, and the translation of centroids of consecutive move events is used to determine the pan gesture to apply.

23 Claims, 5 Drawing Sheets

PAN AND ZOOM GESTURE DETECTION IN A MULTIPLE TOUCH DISPLAY

BACKGROUND

People are increasingly relying on computing devices, such as tablets and smartphones, which utilize touch sensitive displays. These displays enable users to enter text, select displayed items, or otherwise interact with the devices by touching and performing various movements with respect to the display screen, as opposed to other conventional input methods, such as using a mouse or directional keys on a keyboard. Many mobile computing devices include touch sensitive displays that can detect multiple touches, such as where a user uses two or more fingers to provide concurrent input. These multi-touch enabled devices are programmed to interpret the movement of multiple touches over a period of time as user inputs to perform certain functions, such as panning or zooming the image on the display.

Current touch-based pan and zoom gesture detection methods rely on state-based counting of touch points in order to distinguish and respond to user interaction. As touch event notifications are received by a software application on the computing device, the application maintains a history of these events over time in order to respond appropriately to the user's input. This requires bookkeeping on the part of the application in order to track several different types of events, and can result in a fragile decision tree. Accordingly, there is a need for improved methods and systems for handling multi-touch inputs.

DETAILED DESCRIPTION

In the following description, reference is made to the accompanying drawings which illustrate several embodiments of the present invention. It is understood that other embodiments may be utilized and mechanical, compositional, structural, and electrical operational changes may be made without departing from the spirit and scope of the present disclosure. The following detailed description is not to be taken in a limiting sense, and the scope of the embodiments of the present invention is defined only by the claims of the issued patent.

Systems and methods in accordance with various embodiments of the present disclosure may overcome one or more of the aforementioned and other deficiencies experienced in conventional approaches to providing input to a computing device. In particular, various approaches described herein enable a touch sensing computing device to interpret a series of touch points as user inputs for modifying an image being displayed. In accordance with certain embodiments, the computing device does not need to keep track of finger down touch events or count how many fingers are being used at any moment. Instead, the computing device can use the difference in the mean absolute deviation of consecutive move events to determine the how to scale an image. As a result, an arbitrary number of touch points can be used to scale an image. In addition, a user may execute both a panning function and a zooming function using a single gesture without picking up or putting down fingers.

Figures 2A, 2B:
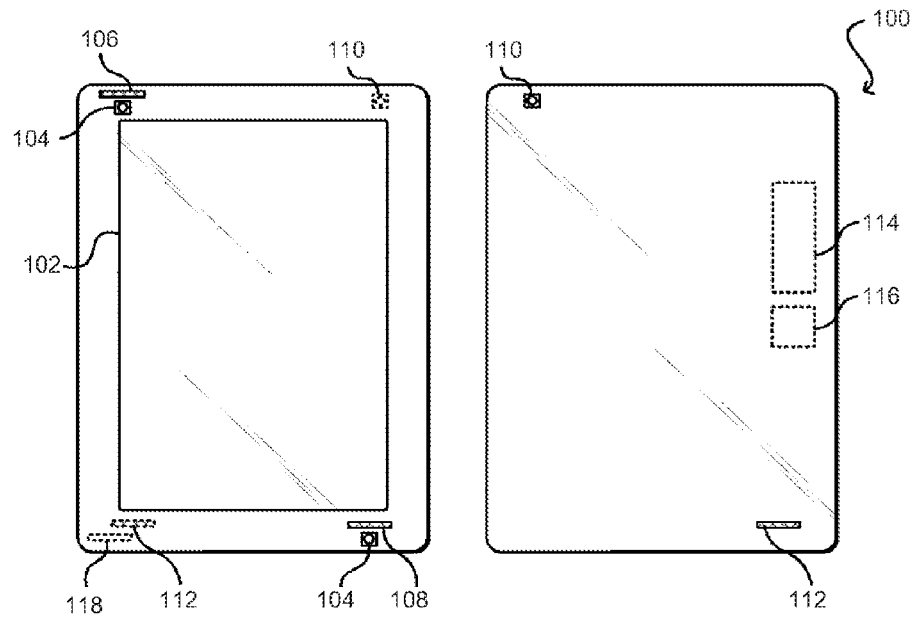
FIGS. 2A-2B illustrate front and back views, respectively, of an example computing device that can be used in accordance with various embodiments.

FIGS. 2A-2B illustrate front and back views, respectively, of an example computing device 100 that can be used in accordance with various embodiments. Although one example of a portable computing device is shown, it should be understood that various other types of computing devices that are capable of determining, processing, and receiving user input can be used in accordance with various embodiments discussed herein. The computing devices can include, for example, smartphones, electronic book readers, tablet computers, notebook computers, personal data assistants, cellular phones, video gaming consoles or controllers, television set top boxes and portable media players, among others.

In this example, the portable computing device 100 has a display 102 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by touching an area of the display corresponding to an image of a button, such as a right or left mouse button, touch point, etc.

Figure 3:
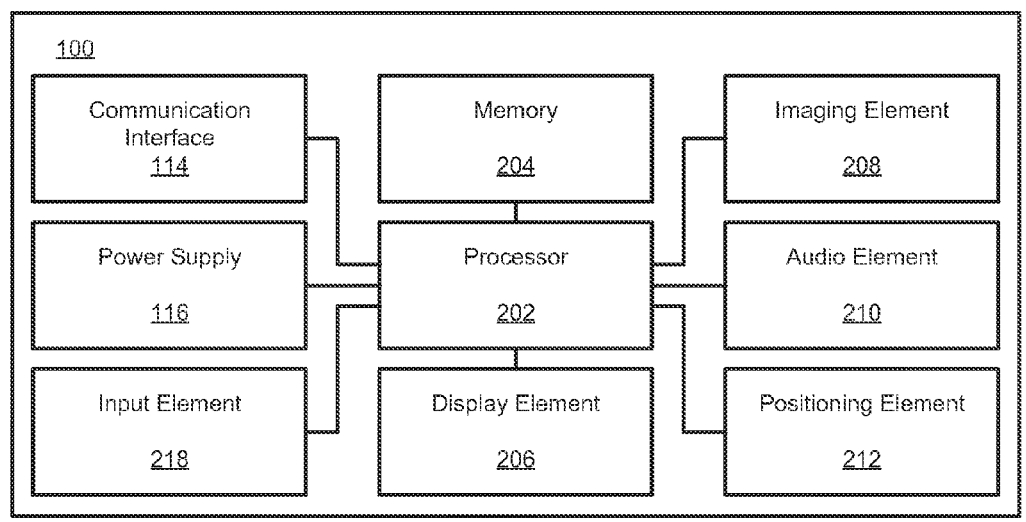
FIG. 3 illustrates an example set of basic components of a portable computing device.

FIG. 3 is an example block diagram illustrating basic components of a computing device, such as computing device 100, in accordance with embodiments of the present invention. In this example, the device 100 includes at least one processor 202 for executing instructions that can be stored in at least one memory device 204. As would be apparent to one of ordinary skill in the art, the memory device 204 can include one or more different types of memory, data storage or computer-readable storage media, such as, for example, a first data storage for program instructions for execution by the processor 202, a second data storage for images or data and/or a removable storage for transferring data to other devices.

The computing device 100 includes a display element 206 for displaying images using technologies such as, for example, electronic ink (e-ink), organic light emitting diode (OLED) or liquid crystal display (LCD). In other embodiments, the display element 206 may comprise an image projector, such as, for example, a CRT projector, LCD projector or LED projector. The image projector projects an image generated by the computing device 100 onto a separate surface. In this embodiment, the separate surface may not incorporate a touch sensitive surface, such as a capacitive or resistive touch sensitive surface. In this case, the touch points may be detected by, for example, image capture elements oriented so as to detect the user's movement relative to the projected image. These image capture elements may be incorporated in the computing device 100 or may be separate devices wired or wirelessly coupled to the computing device 100.

The computing device 100 may include an imaging element 208, such as one or more cameras configured to capture an image of people or objects in the vicinity of the device 100.

In at least some embodiments, the computing device 100 can use the image information detected by the imaging element 208 to determine gestures or motions of the user, which will enable the user to provide input through the portable device without having to actually contact and/or move the portable device. The imaging element 208 also can be used to determine the surroundings of the computing device 100. The imaging element 208 can include any appropriate technology, such as a CCD image capture element having a sufficient resolution, focal range and viewable area, to capture the desired images, such as an image of the user when the user is operating the device 100.

The computing device 100 may also include an audio element 210, such as one or more audio speakers 112 and/or audio capture elements capable of capturing audio data. In some devices there may be only one microphone 106, while in other devices there might be additional audio capture elements (e.g., microphone 108) on other sides and/or corners of the device 100, or in other appropriate locations. The microphones 106, 108 may be used to facilitate voice-enabled functions, such as voice recognition, digital recording, etc. The audio speakers 112 may perform audio output. In some embodiments, the audio speaker(s) may reside separately from the device.

The computing device 100 may also include a positioning element 212, such as motion, position or orientation determining element 118, that provides information such as a position, direction, motion, or orientation of the device 100. This positioning element 212 can include, for example, accelerometers, inertial sensors, electronic gyroscopes, electronic compasses or GPS elements. Various types of motion or changes in orientation can be used to provide input to the device that can trigger at least one control signal for another device.

The computing device 100 can include one or more input elements 218 operable to receive inputs from a user. The input elements 218 can include, for example, a push button, touch pad, touch screen, wheel, joystick, keyboard, mouse, trackball, keypad or any other such device or element whereby a user can provide inputs to the computing device 100. These input elements 218 may be incorporated into the computing device 100 or operably coupled to the computing device via wireless interface.

For computing devices with touch sensitive displays, the input elements 218 can include a touch sensor that operates in conjunction with the display element 206 to permit users to interact with the image displayed by the display element 206 using touch inputs (e.g., with a finger or stylus). In computing devices with LCD displays, the touch sensor may comprise a touchscreen panel positioned on top of an LCD panel to form the display 102. Alternatively, the touch sensor may be integrated with the LCD panel.

In embodiments where the display element 206 comprises a projector that projects an image onto a projection surface, the touch sensor may comprise a touch sensing surface adjacent to the projection surface. Alternatively, the touch sensor may comprise another form of sensor or detector for detecting a user's interaction with the projection surface. For example, an imaging element, such as a camera, may be used to detect the position of the user's finger or hand relative to the projection surface.

The touch sensor may also include a touch controller, which can be, for example, a low power microcontroller dedicated to sensing touches and/or objects in proximity to the display 102. The touch controller is configured to analyze the changes in capacitance and/or electric field in order to detect the presence and location of objects in proximity of the display 102.

The computing device 100 may also include at least one communication interface 114, comprising one or more wireless components operable to communicate with one or more separate devices within a communication range of the particular wireless protocol. The wireless protocol can be any appropriate protocol used to enable devices to communicate wirelessly, such as Bluetooth, cellular, or IEEE 802.11. It should be understood that the computing device 100 may also include one or more wired communications interfaces for coupling and communicating with other devices.

Figure 4:
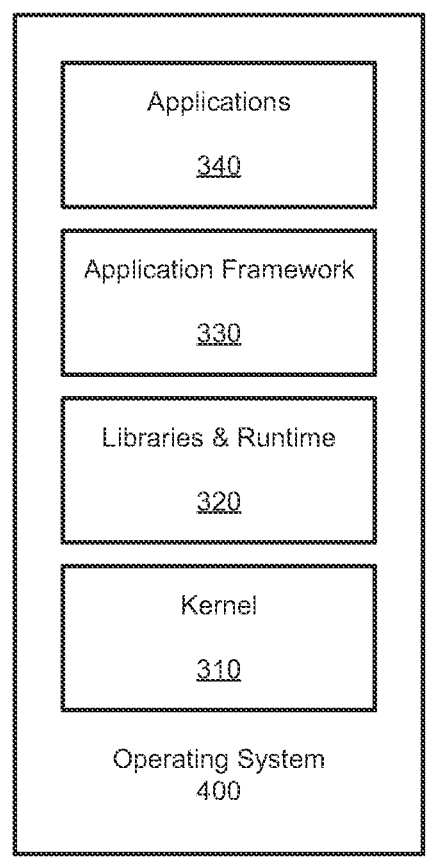
FIG. 4 illustrates an example architecture for an operating system of a portable computing device.

FIG. 4 illustrates an example architecture for a computing device 100, in accordance with embodiments of the present invention. In some embodiments, the computing device 100 may include a Linux-based operating system, such as the Android operating system by Google, Inc. The operating system 400 shown in FIG. 4 includes four primary layers: the kernel layer 310, libraries and runtime layer 320, application framework layer 330 and applications layer 340. The kernel layer 310 may include the low-level device drivers for the various hardware components of the computing device 100. The libraries and runtime layer 320 may include the code implementing the primary operating system features, such as database support, web browsing support, graphics support and other core runtime libraries used by application developers. The application framework layer 330 provides an application programming interface (API) that permits applications to access various services and systems of the device 100. The applications layer 340 includes native and third party software applications for use by the user, such as, for example, an email client, calendar application, mapping application, web browser application and contacts application.

Figure 5:
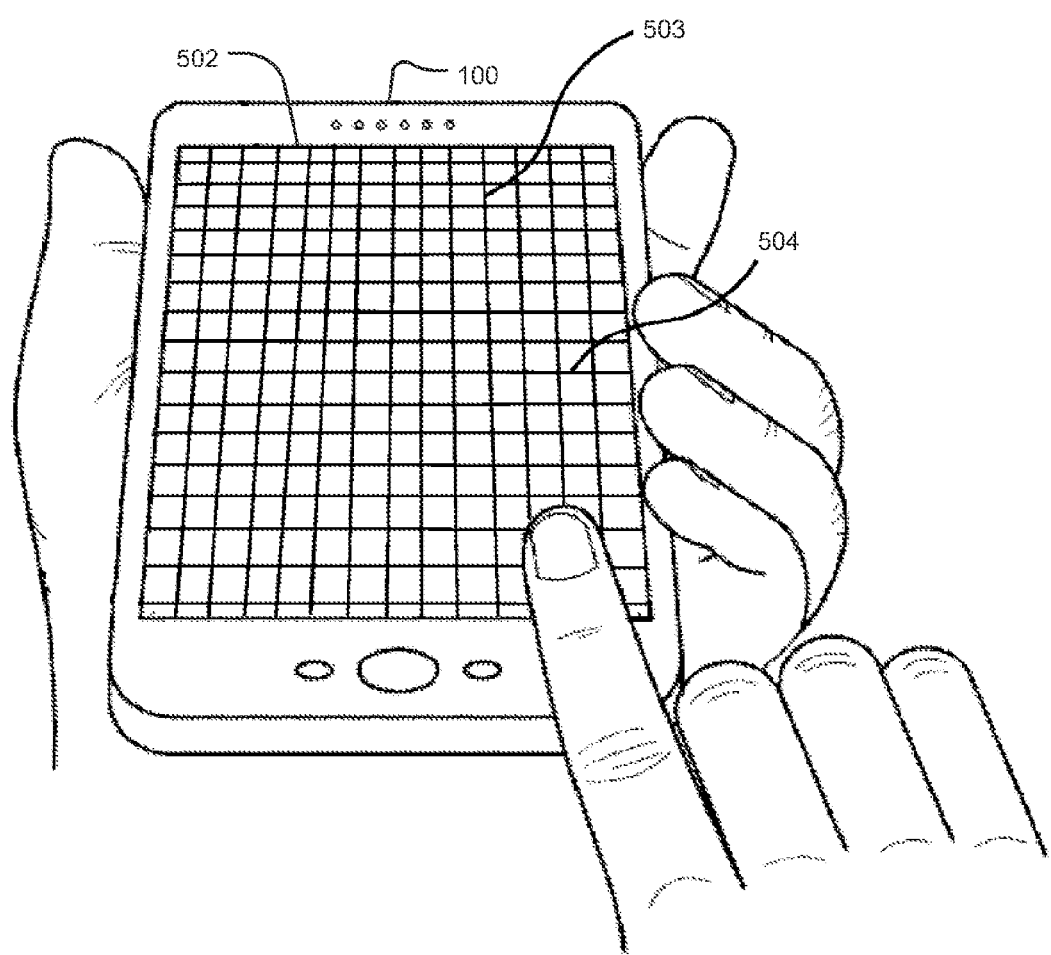
FIG. 5 illustrates an example of a portable computing device utilizing a grid of sensor lines that can be used to detect objects coming in contact with the touch screen display, in accordance with various embodiments.

FIG. 5 illustrates an example of a portable computing device 100 utilizing a grid of sensor lines that can be used to detect objects coming in contact with the touch-sensitive display 102, in accordance with various embodiments. In the illustrated embodiment, the sensor lines are arranged in a grid formation 502 that includes a plurality of parallel rows 504 and a plurality of parallel columns 503. The grid formation 502 can cover all or a portion of the display 102 of the computing device 100.

In accordance with some embodiments implementing a mutual capacitance touch sensitive display 102, the columns 503 of the grid are configured to be transmitters that transmit an electronic signal (e.g., emit an electric field) and the rows 504 are configured as receivers that receive the electronic signal. When a conductive object, such as a finger, contacts or is in close proximity to the display 102, the object reduces the amount of signal that the receiver is receiving. Based on such reduced signal being detected the touch controller can determine the location of the object on the screen at the intersection of the transmitter and receiver. Mutual capacitance thus enables the controller to determine the locations of multiple touches based on changes in capacitance at each intersection.

In accordance with some embodiments implementing a self-capacitance touch sensitive display 102, there are no transmitters or receivers. Instead, each sensor line 503, 504 is treated as a conductive plate. In this mode, the touch controller is capable of measuring the base self-capacitance of each sensor line. When an object, such as a finger, touches one or more of the sensor lines (or comes into close proximity with the sensor lines), the capacitance of the object is added to the capacitance of the sensor line. The line thus sees an increase in capacitance, which is detected by the touch controller. Based on the intersection of the lines which have seen an increase in capacitance, the touch controller is able to determine the location of the object on the screen.

In various embodiments, the plurality of sensors of the touch sensitive display 102 can be contained in a single sensor layer or can be distributed between multiple layers of the display 102. For example, in some embodiments, the sensor rows may be contained in one layer, while the sensor columns are contained in a separate sensor layer. In other embodiments, both rows and columns are contained in the same layer.

Figure 6:
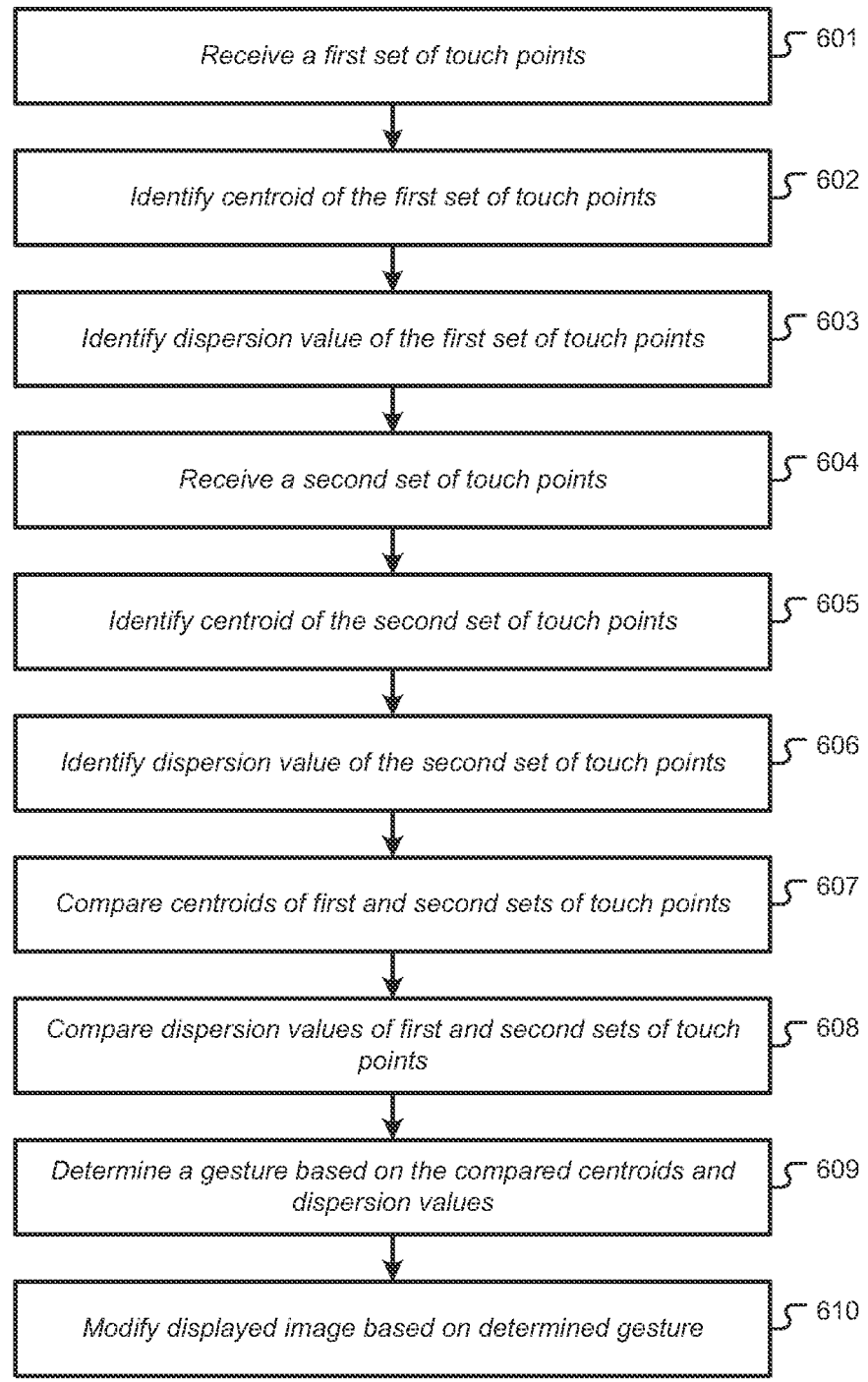
FIG. 6 illustrates an example of a process for rendering an image on a computing device, in accordance with various embodiments.

FIG. 6 illustrates an example of a process for rendering an image on a computing device, in accordance with various embodiments. In step 601, a first set of touch points is received. Each touch point comprises a contact point detected by the touch controller and interpreted by the operating system as a discrete user contact with the image on the display 102. In some embodiments, the set of touch points is determined by the operating system 400 and received in step 601 by an application in application layer 340 that the user is currently interacting with on the display 102. In accordance with various embodiments, the touch points can represent different types of contacts with the display 102. In some embodiments, the operating system may interpret a single large, continuous contact patch on the display as a single touch point. In this case, if the user presses an entire palm against the display 102, the operating system may generate a single touch point representing that palm. In other embodiments, the operating system may provide a higher degree of resolution in detecting touches, such that a contact patch from a single palm pressed against the display 102 may generate a plurality of touch points that are delivered to the application.

Figure 1A:
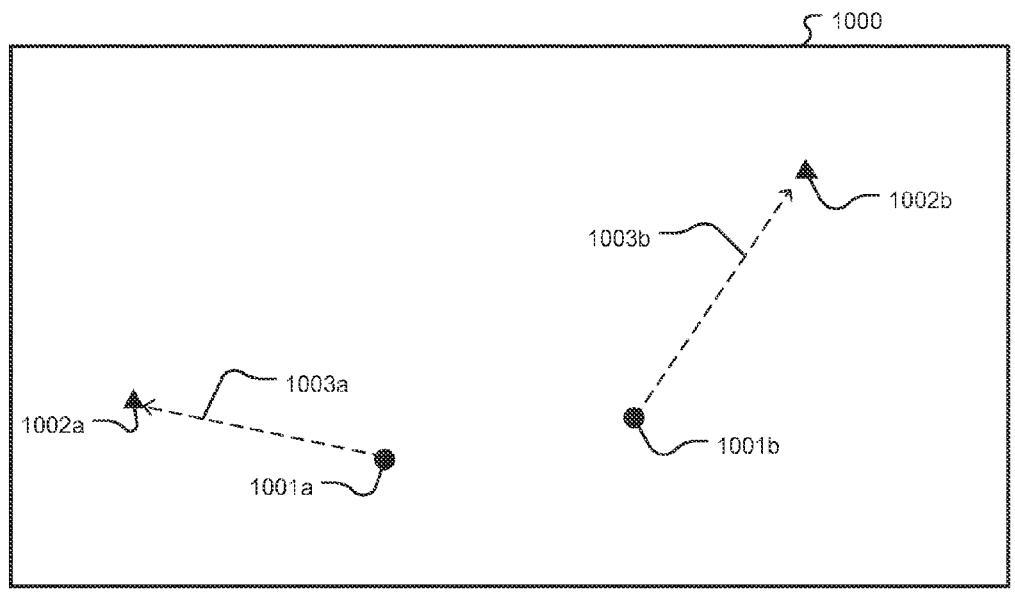
FIG. 1A illustrates an example of a first and second set of touch points.

FIG. 1A illustrates the locations of first and second sets of touch points within a coordinate space 1000 of the display 102. The first set of touch points includes touch points 1001a-1001b. In this example, touch point 1001a may represent a first finger of a user and touch point 1001b may represent a second finger of the user, with both fingers in simultaneous contact with the display 102. The first set of touch points 1001a-1001b represent all of the touch points detected at a single moment in time.

Next, a first event analysis is performed. The first event analysis comprises identifying the central tendency of the first set of touch points in step 602 and identifying a dispersion value for the first set of touch points in step 603.

The central tendency can be any location within the coordinate space 1000 representing an average of the touch points in a set of touch points. In some embodiments, the central tendency can be determined by calculating the centroid of the touch points in the set of touch points. The centroid is the arithmetic mean of all of the touch points in the set of touch points detected at a particular moment. For a two-dimensional image, the centroid can be defined by an X-Y coordinate location within the display. The centroid C of a set of k points $x_1, x_2, x_3, \ldots x_k$, may be calculated as follows:

$$C = \frac{x_1 + x_2 + x_3 + \ldots + x_k}{k}$$

The dispersion value can be any value representing the dispersion of touch points across the coordinate space 1000. In some embodiments, the dispersion value can be determined by calculating the mean absolute deviation of all of the touch points in the first set of touch points. The mean absolute deviation of a set of data can be determined by calculating the mean of the absolute deviations of the set of data about the data's mean. In a two-dimensional coordinate space, where each touch point has an X-Y coordinate location, the mean absolute deviation is calculated as a single value, not a coordinate pair. In other embodiments, the dispersion value can be determined by calculating the average or median absolute deviation of all of the touch points in the first set of touch points.

Figure 1B:
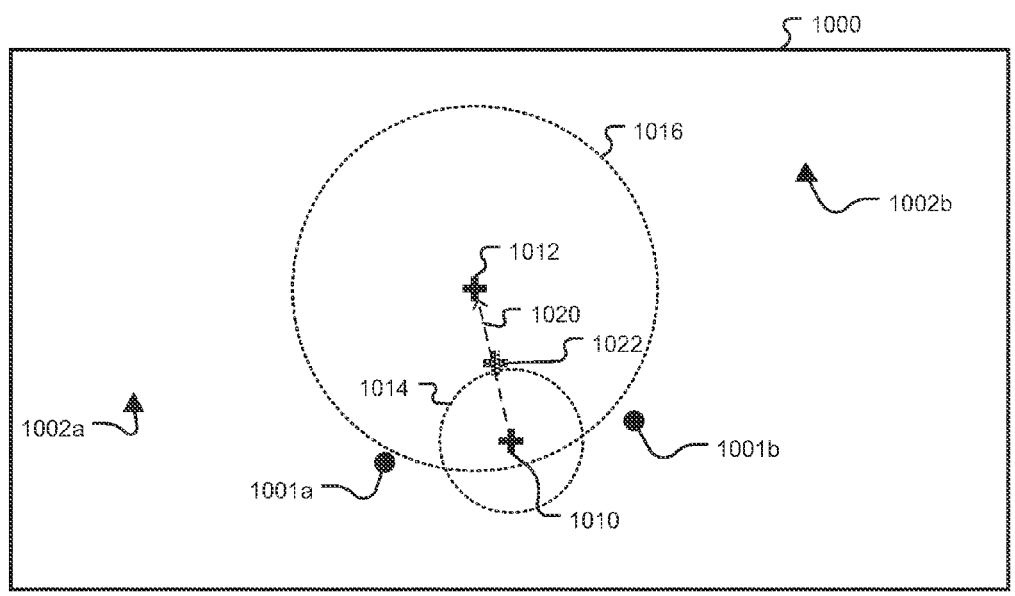
FIG. 1B illustrates an example of gesture detection, in accordance with various embodiments.

FIG. 1B illustrates an example of gesture detection using event analysis, in accordance with various embodiments. In FIG. 1B, the location of the centroid 1010 of the first set of touch points 1001a-1001b is shown. The mean absolute deviation of the first set of touch points 1001a-1001b is represented for illustrative purposes by a circle 1014 centered at centroid 1010 and having a radius corresponding to the value of the mean absolute deviation.

After a period of time has passed, a second set of touch points is received in step 604. FIG. 1A shows an example of a second set of touch points 1002a, 1002b. This can represent the touch points that may be detected when a user first places two fingers onto touch points 1001a and 1001b, respectively, and then slides each of those fingers along paths 1003a, 1003b, respectively, to arrive at the touch point locations 1002a, 1002b.

The frequency with which each new set of touch points is received can vary in different embodiments. In various embodiments, a new set of touch points may be received, for example, 60 times per second, 20 times per second, once per second, or at any other desired frequency that is supported by the hardware and operating system of the computing device 100.

Next, a second event analysis is performed. The second event analysis comprises identifying the central tendency of the second set of touch points in step 605 and identifying a dispersion value for the second set of touch points in step 606. The determination of the central tendency in step 605 and the dispersion value in step 606 can be performed in the same way as in steps 602 and 603, respectively. In FIG. 1B, the centroid 1012 of the second set of touch points 1002a, 1002b is shown, and the mean absolute deviation of the second set of touch points 1002a, 1002b is represented by circle 1016 centered at centroid 1012 and having a radius corresponding to the value of the mean absolute deviation of the second set of touch points. Because the touch points 1002a, 1002b in the second set of touch points are located farther apart than the touch points 1001a, 1001b in the first set of touch points, the mean absolute deviation of the second set of touch points is larger, represented by a circle 1016 having a larger radius.

In step 607, the centroids of the first and second sets of touch points are compared. In step 608, the dispersion values of the first and second sets of touch points are compared. In step 609, a gesture is determined based on the compared centroids and dispersion values. In step 610, the image displayed on the display 102 is modified in accordance with the determined pan and/or zoom gestures.

In step 607, the translation 1020 from the first centroid 1010 to the second centroid 1012 may be used to define a pan gesture from the user. This pan gesture represents a direction and magnitude of image translation desired by the user. In response to receiving the pan gesture, the application or operating system performs a pan operation to an image currently being displayed. The computing device 100 can generate an image or other visual representation of data that fills a graphical space larger than the displayed element within the field of view of the display 102. The panning operation causes the computing device to translate the image across the field of view on the display 102 to expose other portions of the image. Examples of panning include one-dimensional panning, such as the scrolling of a document up and down in a window, or two-dimensional, such as the translation of an image across the user's field of view in the display 102. For example, if the user is viewing a map image in a mapping application, the pan gesture defines how the image of the map should be translated across the screen. In another embodiment, if the user is viewing a document in a word processing application, the pan gesture defines the direction and magnitude of scrolling of that document. The pan gesture may be interpreted in various ways, depending on the application being used.

The comparison of dispersion values in step 608 may be used to determine a zoom gesture. In response to receiving the zoom gesture, the application or operating system performs a zoom operation to an image currently being displayed. The zoom operation causes the computing device to increase or decrease the size of an image within the field of view on the display 102. The zoom gesture may be determined by calculating a zoom scaling factor, which determines the magnitude of a magnification or shrinking of an image displayed on the display 102. In one embodiment, the zoom scaling factor may be calculated as a function of the ratio of the second mean absolute value to the first mean absolute value. A large zoom scaling factor can be interpreted as a user's request for a large zoom, a small scaling factor can be interpreted as a user's request for a small zoom, and a scaling factor of less than one can be interpreted as a user's request to shrink the image. In some embodiments, the amount of zoom determined by the gesture is equal to the ratio of the second mean absolute value to the first mean absolute value. In other words, the zoom scaling factor is applied on a 1:1 basis with the change in mean absolute value to determine the amount of zoom, so if the ratio of the second mean absolute value to the first mean absolute value is 2, the determined gesture results in a 200% zoom. In other embodiments, the zoom scaling factor may be adjusted by some amount to determine the amount of zoom applied, and need not be applied on a 1:1 basis.

The zoom gesture may perform different functions, depending on the application being used. For example, in some applications, the zoom gesture may cause the application to resize the text being displayed on the display 102, where a zoom scaling factor greater than one causes an increase in font size, and a zoom scaling factor less than one causes a decrease in text size. In other applications, the zoom gesture may cause the application to resize images or other objects being displayed on the display 102.

In the embodiments described above with respect to FIGS. 1A-1B, only two touch points exist at each point in time. However, the determination of the dispersion value and central tendencies of each set of touch points may be performed using any number of touch points. As a result, it is not necessary for an application to maintain a record of all of the touch points at each point in time over a extended period of time. The determination of the user's gesture input can be made using only a comparison of the subsequent dispersion values and central tendencies. The exact locations of each of the touch points need not be stored and can be discarded after the dispersion value and central tendency is calculated for each set of touch points.

In addition, if the user chooses to use more than two fingers or to use two palms to make a pan or zoom gesture, the dispersion value and central tendency of those touch points can still be used to determine the user's desired gesture.

In many conventional touch screen devices, the systems are programmed to interpret multi-touch inputs as a single motion, such as pan or a zoom, but not both simultaneously. A single gesture, such as the one depicted in FIGS. 1A-1B, is typically interpreted as either a pan or a zoom, but not both. In these types of systems, if the user begins moving his or her fingers across the screen in a way that is initially interpreted as a panning gesture, then even if the user begins to spread his or her fingers apart in a way that would normally be interpreted as a zoom gesture, the computing system will remain locked in a panning state until the user removes his or her fingers from the touch screen.

In accordance with some embodiments of the present invention, the application may perform both a pan gesture and zoom gesture simultaneously. In some embodiments, the comparison of the first and second centroids can be used to identify a reference point about which the image is scaled. In the embodiment shown in FIG. 1B, the reference point 1022 is the midpoint location between the first centroid 1010 and second centroid 1012. The midpoint location can be calculated by identifying the average of the coordinates of the first centroid 1010 and second centroid 1012, or the midpoint of a line connecting the first centroid 1010 and second centroid 1012. For applications where a zoom gesture is determined, the reference point 1022 is set as the fixed point for determining how to magnify or shrink the image.

In other embodiments, the location of the reference point can be determined in other ways and need not merely be the midpoint of the first and second centroids. For example, the speed of the user's finger movement, magnitude of centroid translation and magnitude of the scaling factor can also be used as factors in identifying the location of the reference point. If the user is scaling the image by a large amount relative to the magnitude of the pan gesture, then the device 100 may interpret this as being an indication that the user wishes to zoom the image about a reference point closer to the first centroid. On the other hand, if the user is scaling the image by a small amount relative to the magnitude of the pan gesture, then the device 100 may interpret this as being an indication that the user wishes to zoom the image about a reference point closer to the second centroid.

In other embodiments where the device 100 is configured to simultaneously perform a pan gesture and a zoom gesture, it may be desirable to have minimum thresholds before initiating each of those gestures. For example, if the magnitude of the translation from the first centroid to the second centroid is less than a predetermined minimum pan threshold, then the device 100 may interpret the translation as insignificant and will not interpret this as a pan gesture. Similarly, if the difference between the first and second dispersion values is less than a predetermined minimum zoom threshold, then the device 100 may interpret the change in dispersion as insignificant and will not interpret this as a zoom gesture.

In yet other embodiments, the determination of whether to interpret a series of touch events as either a pan gesture or a zoom gesture or both can be made by comparing the magnitude of the centroid translation to the magnitude of the change in dispersion values. In other words, if the user's input reflects a very large translation relative to a small change in dispersion, the device 100 may interpret this as primarily a pan gesture and will not generate a zoom gesture, despite the fact that there was a small change in dispersion value. Similarly, if the user's input reflects a very small translation relative to a large change in dispersion, the device 100 may interpret this as primarily a zoom gesture and will not generate a pan gesture, despite the fact that there was a small translation from the first to second centroid.

In yet other embodiments, the device 100 may be configured to disregard a determined gesture if it exceeds a certain maximum amount. This may be a desirable method of handling hardware and/or software errors in the touch detection. For example, if the magnitude of the translation from the first centroid to the second centroid exceeds a predetermined error threshold, the device 100 may disregard that translation and will not generate a corresponding pan gesture. Similarly, if the difference between the first and second dispersion values is greater than a predetermined error threshold, the device 100 may disregard that scaling and will not generate a corresponding zoom gesture. In some embodiments, the error thresholds may be configurable. For example, the error threshold may be a function of the screen size of the display 102. If the screen of the device 100 is very small, then the user may be more likely to accidentally make a large swipe motion across the face of the display 102. In such a case, it may be desirable for the error threshold to be lower to accommodate the increased likelihood that inadvertent touch inputs may be received and to avoid a large inadvertent translation or scaling of the image. In other embodiments, the operating system or application may be configured to detect information regarding the hardware of the device 100 and use that information to set the error thresholds. For example, if the device 100 has a display with a highly sensitive touch display, then it may be desirable to set the error threshold higher.

It may also be desirable to implement a minimum threshold which must be exceeded before the determined gesture is executed. For example, where there is signal noise generated in the touch sensor, it may be desirable for the system to disregard any perceived touch inputs that do not meet a minimum threshold requirement. In some embodiments, if the detected touch input indicates a movement of less than approximately 1 mm, that input may be disregarded. The minimum threshold may vary or be adjusted based on user testing, display size, and/or hardware specifications, such as touch resolution or touch input.

The computing device 100 illustrated in FIGS. 2A-2B is one example of a system implementing aspects of the present invention. Various features and components of the device 100 can vary in different embodiments. As shown in FIGS. 2A-2B, the device 100 can include one or more image capture elements for purposes such as image and/or video capture. The image capture elements can also be used for other purposes, such as to determine motion and receive gesture input. While the portable computing device in this example includes one image capture element 104 on the front of the device 100, as shown in FIG. 2A, and one image capture element 110 on the back of the device 100, as shown in FIG. 2B, it should be understood that image capture elements could also, or alternatively, be placed on the sides or corners of the device, and that there can be any number of image capture elements of similar or different types. Each image capture element may be, for example, a camera, a charge-coupled device (CCD), a motion detection sensor, or an infrared sensor, or can utilize another image capturing technology.

The computing device 100 may also include a power supply 116, such as, for example, a rechargeable battery operable to be recharged through conventional plug-in approaches, or through other approaches such as capacitive charging. Various other elements and/or combinations are possible as well within the scope of various embodiments.

Embodiments of the present invention may provide various advantages not provided by prior art systems. The computing devices may be capable of simultaneously zooming and panning an image without the need for maintaining detailed records of every touch point detected. Accordingly, the computing devices may distinguish and respond to user interaction without state-based counting of individual touch points.

While the invention has been described in terms of particular embodiments and illustrative figures, those of ordinary skill in the art will recognize that the invention is not limited to the embodiments or figures described. For example, in many of the embodiments described above, the touch points are detected by the operating system with the gesture determinations being made at the application level. In other embodiments, the operating system may detect the touch points and determine the corresponding zoom and/or pan gestures. These gesture events may then be passed to gesture listener objects at the application level.

Some portions of the detailed description which follows are presented in terms of procedures, steps, logic blocks, processing other symbolic representations of operations on data bits that can be performed on computer memory. Each step may be performed by hardware, software, firmware, or combinations thereof.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method of zooming and panning an image on a computing device having a touch sensor, comprising:
    detecting a first plurality of touch points with the touch sensor, each touch point comprising a respective location of a corresponding user contact in a first set of user contacts;
    identifying a first centroid of the locations of the first plurality of touch points;
    identifying a first mean absolute deviation value of the locations of the first plurality of touch points;
    after identifying the first centroid of the locations of the first plurality of touch points, detecting a second plurality of touch points indicative of movement of the user contacts;
    identifying a second centroid of the locations of the second plurality of touch points, wherein the second centroid is in a different location than the first centroid;
    identifying a second mean absolute deviation value of the locations of the second plurality of touch points;
    determining a scaling factor comprising a ratio of the second mean absolute value to the first mean absolute value;
    determining a pan gesture corresponding to a direction and a magnitude of translation from the first centroid to the second centroid;
    scaling the image based on said scaling factor; and
    panning the image displayed on the computing device based on said determined pan gesture.

2. The method of claim 1, further comprising identifying a midpoint location between the first and second centroids as a reference point about which said scaling is performed.

3. The method of claim 1, wherein said scaling the image and said panning the image are performed substantially simultaneously.

4. A method of handling touch inputs on a computing device, comprising:
- receiving a first set of touch points, each touch point comprising a location of user interaction with an image;
- identifying a first centroid of the locations of the first set of touch points;
- identifying a first dispersion value of the locations of the first set of touch points;
- after identifying the first centroid of the locations of the first plurality of touch points, receiving a second set of touch points indicative of movement of the user interaction;
- identifying a second centroid of the locations of the second set of touch points, wherein the second centroid is in a different location than the first centroid;
- identifying a second dispersion value of the locations of the second set of touch points;
- determining a gesture based on a comparison of the first and second centroids and a comparison of the first and second dispersion values; and
- generating a modified image based on said determined gesture.

5. The method of claim 4, wherein:
- said computing device comprises a display element and a touch sensor; and
- each touch point comprises the location of user interaction with the touch sensor.

6. The method of claim 4, wherein:
- said first dispersion value comprises a first mean absolute deviation of the locations of the first set of touch points; and
- said second dispersion value comprises a second mean absolute deviation of the locations of the second set of touch points.

7. The method of claim 4, wherein:
- said first dispersion value comprises a first median absolute deviation of the locations of the first set of touch points; and
- said second dispersion value comprises a second median absolute deviation of the locations of the second set of touch points.

8. The method of claim 4, wherein said determining the gesture comprises determining a zoom gesture based on the comparison of the first and second dispersion values.

9. The method of claim 8, wherein:
- said determining the zoom gesture comprises determining a scaling factor comprising a ratio of the second dispersion value to the first dispersion value; and
- said generating the modified image comprises scaling the image based on the calculated scaling factor.

10. The method of claim 8, wherein:
- said determining the zoom gesture comprises determining a scaling factor comprising a ratio of the second dispersion value to the first dispersion value; and
- said generating the modified image comprises scaling the image about a reference point based on the calculated scaling factor, wherein said reference point comprises a midpoint location between the first centroid and the second centroid.

11. The method of claim 8, wherein:
- said determining the zoom gesture comprises determining a scaling factor comprising a ratio of the second dispersion value to the first dispersion value; and
- said generating the modified image comprises scaling the image about a reference point based on the calculated scaling factor, wherein said reference point comprises a location between the first centroid and the second centroid, said location being determined as a function of the period of time between the first and second sets of touch points.

12. The method of claim 4, wherein said determining the gesture comprises determining a pan gesture based on a translation from the first centroid to the second centroid.

13. The method of claim 12, wherein:
- said determining the pan gesture comprises determining a direction and a magnitude of translation from the first centroid to the second centroid, said pan gesture being a function of the determined direction and magnitude; and
- said generating the modified image comprises panning the image based on the determined pan gesture.

14. The method of claim 4, wherein said determining the gesture comprises:
- determining a zoom gesture based on the comparison of the first and second dispersion values; and
- determining a pan gesture based on a translation from the first centroid to the second centroid.

15. The method of claim 14, wherein said generating the modified image includes a panning component if a magnitude of the translation from the first centroid to the second centroid is greater than a pan threshold.

16. The method of claim 14, wherein said generating the modified image includes a zoom component if a difference between the first and second dispersion values is greater than a zoom threshold.

17. The method of claim 16, wherein said zoom threshold is a function of a magnitude of the translation from the first centroid to the second centroid.

18. The method of claim 14, wherein said generating the modified image includes a panning component if a magnitude of the translation from the first centroid to the second centroid is less than an error threshold.

19. The method of claim 14, wherein said generating the modified image includes a zoom component if a difference between the first and second dispersion values is less than an error threshold.

20. A computing device, comprising:
- a touch sensor;
- a processor; and
- a computer-readable memory storing computer-executable instructions which when executed cause the processor to perform a method comprising:
  - receiving a first set of touch points, each touch point comprising a location of user interaction with an image;
  - identifying a first centroid of the locations of the first set of touch points;
  - identifying a first dispersion value of the locations of the first set of touch points;
  - after identifying the first centroid of the locations of the first plurality of touch points, receiving a second set of touch points indicative of movement of the user interaction;
  - identifying a second centroid of the locations of the second set of touch points, wherein the second centroid is in a different location than the first centroid;
  - identifying a second dispersion value of the locations of the second set of touch points;
  - determining a gesture based on a comparison of the first and second central centroids and a comparison of the first and second dispersion values; and
  - generating a modified image based on said determined gesture.

21. The device of claim 20, wherein said determining the gesture comprises determining a zoom gesture based on the comparison of the first and second dispersion values.

22. The device of claim 21, wherein:
said determining the zoom gesture comprises determining a scaling factor comprising a ratio of the second dispersion value to the first dispersion value; and
said generating the modified image comprises scaling the image based on the calculated scaling factor.

23. The device of claim 20, wherein:
said first dispersion value comprises a first mean absolute deviation of the locations of the first set of touch points; and
said second dispersion value comprises a second mean absolute deviation of the locations of the second set of touch points.

\* \* \* \* \*